United States Patent
Thomée

(10) Patent No.: US 10,623,517 B2
(45) Date of Patent: Apr. 14, 2020

(54) CONTENT PREFETCHING AND CACHE MANAGEMENT

(71) Applicant: Oath Inc., New York, NY (US)

(72) Inventor: Bart Thomée, San Francisco, CA (US)

(73) Assignee: Oath Inc., New York, NY (US)

( * ) Notice: Subject to any disclaimer, the term of this patent is extended or adjusted under 35 U.S.C. 154(b) by 739 days.

(21) Appl. No.: 14/982,136

(22) Filed: Dec. 29, 2015

(65) Prior Publication Data

US 2017/0187822 A1    Jun. 29, 2017

(51) Int. Cl.
| | |
|---|---|
| *H04L 29/08* | (2006.01) |
| *G06F 16/95* | (2019.01) |
| *G06F 16/2457* | (2019.01) |
| *G06F 16/957* | (2019.01) |

(52) U.S. Cl.
CPC .... *H04L 67/2847* (2013.01); *G06F 16/24575* (2019.01); *G06F 16/95* (2019.01); *G06F 16/9574* (2019.01); *H04L 67/22* (2013.01)

(58) Field of Classification Search
CPC ............... G06Q 30/0277; G06Q 30/02; G06Q 30/0241; H04L 67/42; H04L 67/22; H04L 67/2847
See application file for complete search history.

(56) References Cited

U.S. PATENT DOCUMENTS

| | | | | |
|---|---|---|---|---|
| 7,136,875 | B2 * | 11/2006 | Anderson | G06Q 30/02 |
| 7,975,025 | B1 * | 7/2011 | Szabo | G06F 16/9574 |
| | | | | 709/218 |
| 8,086,559 | B2 * | 12/2011 | Anderson | G06Q 30/02 |
| 9,098,856 | B2 * | 8/2015 | Sinn | G06Q 30/02 |
| 9,270,718 | B2 * | 2/2016 | Emerson | H04L 67/10 |
| 9,286,616 | B2 * | 3/2016 | Kilar | G06Q 30/02 |
| 9,319,360 | B2 * | 4/2016 | Shih | H04L 51/046 |
| 9,380,332 | B1 * | 6/2016 | Mills | H04N 21/43 |
| 9,392,228 | B2 * | 7/2016 | Kandekar | H04N 7/17318 |
| 9,661,374 | B1 * | 5/2017 | Erdmann | H04N 21/4331 |
| 9,705,950 | B2 * | 7/2017 | Trammell | H04W 4/029 |
| 9,872,076 | B1 * | 1/2018 | Lewis | H04N 21/4788 |
| 10,057,715 | B1 * | 8/2018 | Meganathan | H04W 4/023 |
| 2007/0294773 | A1 * | 12/2007 | Hydrie | G06F 21/10 |
| | | | | 726/27 |
| 2009/0070114 | A1 * | 3/2009 | Staszak | G09B 5/06 |
| | | | | 704/260 |

(Continued)

*Primary Examiner* — Shean Tokuta
(74) *Attorney, Agent, or Firm* — Cooper Legal Group, LLC

(57) ABSTRACT

The presentation of content items within a hosting item is typically performed by on-demand retrieval of the content item from a content server. However, on-demand retrieval may impose an undesirable delay in the presentation of the content; may spontaneously alter the layout of the hosting item; and/or may involve an expedient but unsophisticated selection among the content items of a content store (e.g., random selection), resulting in the presentation of irrelevant and/or redundant content. Instead, a device may prefetch content items into a content cache, such that when a user later requests to view a hosting item, the device may insert a content item selected from the content cache. The device may also notify the content server when a content item has been presented to the user; by marking the content item as such, the content server may provide additional, fresh content for the device content cache.

20 Claims, 10 Drawing Sheets

(56) References Cited

U.S. PATENT DOCUMENTS

| | | | |
|---|---|---|---|
| 2010/0005109 A1* | 1/2010 | Etoh | G11B 27/36 707/E17.044 |
| 2010/0042499 A1* | 2/2010 | Barton | G06Q 30/02 705/14.53 |
| 2010/0251278 A1* | 9/2010 | Agarwal | H04H 20/106 725/9 |
| 2010/0251289 A1* | 9/2010 | Agarwal | H04N 7/16 725/34 |
| 2010/0306044 A1* | 12/2010 | Martin-Cocher | G06Q 30/00 705/14.41 |
| 2010/0312858 A1* | 12/2010 | Mickens | G06F 16/9574 709/219 |
| 2011/0078023 A1* | 3/2011 | Aldrey | G06Q 30/02 705/14.55 |
| 2011/0078723 A1* | 3/2011 | Stettner | G06Q 30/02 725/32 |
| 2011/0281566 A1* | 11/2011 | Davis | H04M 1/72533 455/414.1 |
| 2012/0072270 A1* | 3/2012 | Waylonis | G06Q 30/02 705/14.1 |
| 2012/0079548 A1* | 3/2012 | Whitten | H04N 21/4335 725/115 |
| 2012/0137059 A1* | 5/2012 | Yang | G06F 3/0611 711/104 |
| 2012/0227076 A1* | 9/2012 | McCoy | H04N 21/2387 725/110 |
| 2013/0173754 A1* | 7/2013 | van Os | H04L 67/02 709/219 |
| 2013/0237147 A1* | 9/2013 | Dearman | G06F 9/5044 455/41.1 |
| 2013/0282856 A1* | 10/2013 | Heller | G11B 27/10 709/213 |
| 2014/0189524 A1* | 7/2014 | Murarka | G06Q 50/01 715/744 |
| 2014/0189539 A1* | 7/2014 | St. Clair | G06F 3/048 715/753 |
| 2015/0067510 A1* | 3/2015 | Hashikami | G06F 3/0482 715/716 |
| 2015/0081851 A1* | 3/2015 | Oyman | H04W 74/0833 709/219 |
| 2015/0100702 A1* | 4/2015 | Krishna | H04N 21/23439 709/231 |
| 2015/0185856 A1* | 7/2015 | Liu | H04N 21/4126 345/173 |
| 2015/0220235 A1* | 8/2015 | Tully | G06Q 30/0271 715/760 |
| 2015/0222493 A1* | 8/2015 | Tully | G06F 17/2252 715/234 |
| 2015/0242519 A1* | 8/2015 | Alsina | G06F 16/435 707/722 |
| 2015/0293673 A1* | 10/2015 | Peters | G06F 8/38 715/763 |
| 2015/0324605 A1* | 11/2015 | Yoon | G06F 21/31 726/28 |
| 2015/0379160 A1* | 12/2015 | Avraham | G06F 3/0484 715/767 |
| 2016/0063555 A1* | 3/2016 | Sohn | G06Q 30/0257 705/14.5 |
| 2016/0100043 A1* | 4/2016 | Hillier | H04M 1/7253 455/426.1 |
| 2016/0191651 A1* | 6/2016 | Balakrishnan | H04L 67/2847 709/219 |
| 2016/0241445 A1* | 8/2016 | Kim | H04L 67/10 |
| 2016/0255379 A1* | 9/2016 | Langan | H04N 21/4147 725/88 |
| 2016/0337516 A1* | 11/2016 | Runyan | H04M 3/4935 |
| 2017/0102831 A1* | 4/2017 | Stauffer | G06F 3/0481 |
| 2017/0104840 A1* | 4/2017 | Spagnola | H04L 67/2852 |
| 2017/0134771 A1* | 5/2017 | Barton | G06F 1/3203 |
| 2017/0154358 A1* | 6/2017 | Cox | G06Q 30/02 |
| 2017/0155935 A1* | 6/2017 | Chen | G06Q 30/0251 |
| 2017/0169462 A1* | 6/2017 | Meredith | G06Q 30/0244 |
| 2017/0353571 A1* | 12/2017 | St. Clair | H04L 67/303 |
| 2018/0316768 A1* | 11/2018 | Goldsmith | H04L 67/16 |

* cited by examiner

CONTENT PREFETCHING AND CACHE MANAGEMENT

BACKGROUND

Within the field of computing, many scenarios involve a content system that presents content items to one or more users, such as images, audio, video, and text. The content items may be presented by insertion into a hosting item, such as a video that is inserted into a content position within a document that is retrieved from a document source, such as a web page retrieved from a webserver. In many such scenarios, when the user initiates a request on a device to present a web page, the device may retrieve the web page from the webserver, and the web page may include an element (such as an HTML tag) that references a content item to be retrieved from a content server and presented at a particular content position. Accordingly, the device may retrieve the content item from the content server, and, within a rendering of the web page that is presented to the user, may present the content item received from the content server.

In some such scenarios, the particular content item to be displayed within the hosting item may be variable; e.g., the content item may comprise a selection of an image from among an image album. The content server may update the image album with new images that may be inserted into the content position of the hosting item. Accordingly, when the device receives the hosting item and initiates the request for a content item to be inserted at the content position, the content server may choose from among the images of the image album and transmit the selected image to the device for inclusion in the hosting item. In this manner, the content item presented within the hosting item may be dynamically updated, and may result in a different presentation of the content item to the user for successive renderings of the hosting item (e.g., to present fresh content items to the user, rather than repeatedly presenting the same content items to the user).

SUMMARY

The presentation of a content item within a hosting item such as a web page may be achieved by retrieving the content item in response to the user requesting the presentation of the hosting item. However, in some scenarios, such on-demand retrieval may exhibit a variety of disadvantages.

As a first such example, the on-demand retrieval may impose a delay in the presentation of the content item to the user. For example, if the content item comprises an image or video of a significant data size, initiating the retrieval of the content item (possibly including an initiation of a streaming channel at a suitable bit rate and encoded with suitable media protocols) may require a nontrivial period of time to complete, in some cases scaling up to several seconds. This period may delay the presentation of the content item, which may in turn delay the presentation of the hosting item to the user. The delay in the presentation of the hosting item may frustrate the user, or even prompt the user to cancel the request for the presentation of the hosting item (such as refreshing the page, navigating to a different page, or closing the browser window).

As a second such example, the delay in presenting the hosting item may be mitigated by promptly presenting the hosting item with a placeholder for the content item, and when the content item has been retrieved and is ready for presentation, updating the hosting item by inserting the content item into the content position. However, such updating may alter the layout of the hosting item. For example, the hosting item may not specify the visual size of the content item; and the content item that is provided by the content server may exhibit a content size that requires a layout adjustment of the web page. The layout adjustment may result in a repositioning, reorientation, and/or resizing of the content of the hosting item, which may interrupt the user's review of the hosting item. As one example, the user may be reading text within a web page, but the insertion of a retrieved image into the web page may force a layout adjustment that significantly reformats the text, causing the user to lose his or her place within the document. Such changes to the layout of the hosting item may frustrate the user, particularly since such changes may occur unpredictably (e.g., upon completing the retrieval of the content item, which may vary based on connectivity, bandwidth, and/or server load) and/or spontaneously (e.g., without any user input or apparent cause).

As a third such example, the on-demand retrieval of the content item may fail if the connectivity of the device varies; e.g., if the device loses network connectivity or if the content server is inaccessible, the content item cannot be retrieved and inserted into the hosting item, thereby diminishing the content of the hosting item (e.g., image accompanying an article may be missing). Alternatively, the device may be able to retrieve the content on-demand but only at a significant cost (e.g., a mobile device may retrieve a large content item over a metered and/or capped mobile network connection that entails a significant service cost to the user).

As a fourth such example, because the on-demand retrieval of content items often requires a prompt response (e.g., to minimize the user's delay in viewing the hosting item), the selection of a content item for presentation to the user may not be achievable with a high degree of sophistication. For example, in view of such timing constraints, it may not be possible to choose among a thousand images of an image library in a manner that is relevant to the hosting item and/or to the interests of the user, nor to ensure that the selected content item has not been previously presented to the user. Rather, such content servers may have to utilize selection criteria that may be applied expediently (e.g., selecting the content item randomly), which may result in the presentation of a content item that the user has already viewed (possibly repeatedly) and/or that is not relevant to the hosting item or the user.

Presented herein are techniques that may address some of these and other disadvantages in scenarios involving the presentation of content items within hosting items. In accordance with the techniques presented herein, the device may include a content cache, where content items may be prefetched (e.g., retrieved and stored before the user requests the presentation of the hosting item within which such content items are presented). At a first time, the device may retrieve at least two content items from a content server, and store such content items in the content cache. Subsequently (at a second time after the first time), the device may receive a request from the user to present a hosting item. The device may then choose a selected content item from the content cache, insert the content item (already stored on the device) into a content position of the hosting item, and present the hosting item (including the selected content item) to the user. The device may also remove the selected content item from the content cache after presentation to the user, e.g., in order to avoid presenting the same content item to the user in a second hosting item, and/or to relocate storage capacity to the retrieval of new content items from the content server.

Additionally, presented herein are techniques for enabling a device and a content server to coordinate the prefetching of such content items in a manner that enables a more suitable selection of content for the user, and in particular the presentation of fresh content items that the user has not previously viewed. When the device detects that a prefetched item has been inserted into a hosting item and presented to the user, the device may transmit to the content server a notification of the viewing of the content item, and the content server may mark the content item as having been viewed by the user. Responsive to prefetch request from the device to retrieve content items for storage in the content cache and later presentation to the user, the content server may choose content items from a content store that have not been marked as previously presented to the user. The content server may transmit such selected content items to the device, which may store the prefetched content items in the content cache, and may choose among such content items for subsequent presentations of hosting items. In this manner, the device and content server may reduce a repeated and redundant presentation of a single content item to the user, in accordance with the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenario

The following provides a discussion of some types of computing scenarios in which the disclosed subject matter may be utilized and/or implemented.

1.1. Networking

Figure 1:
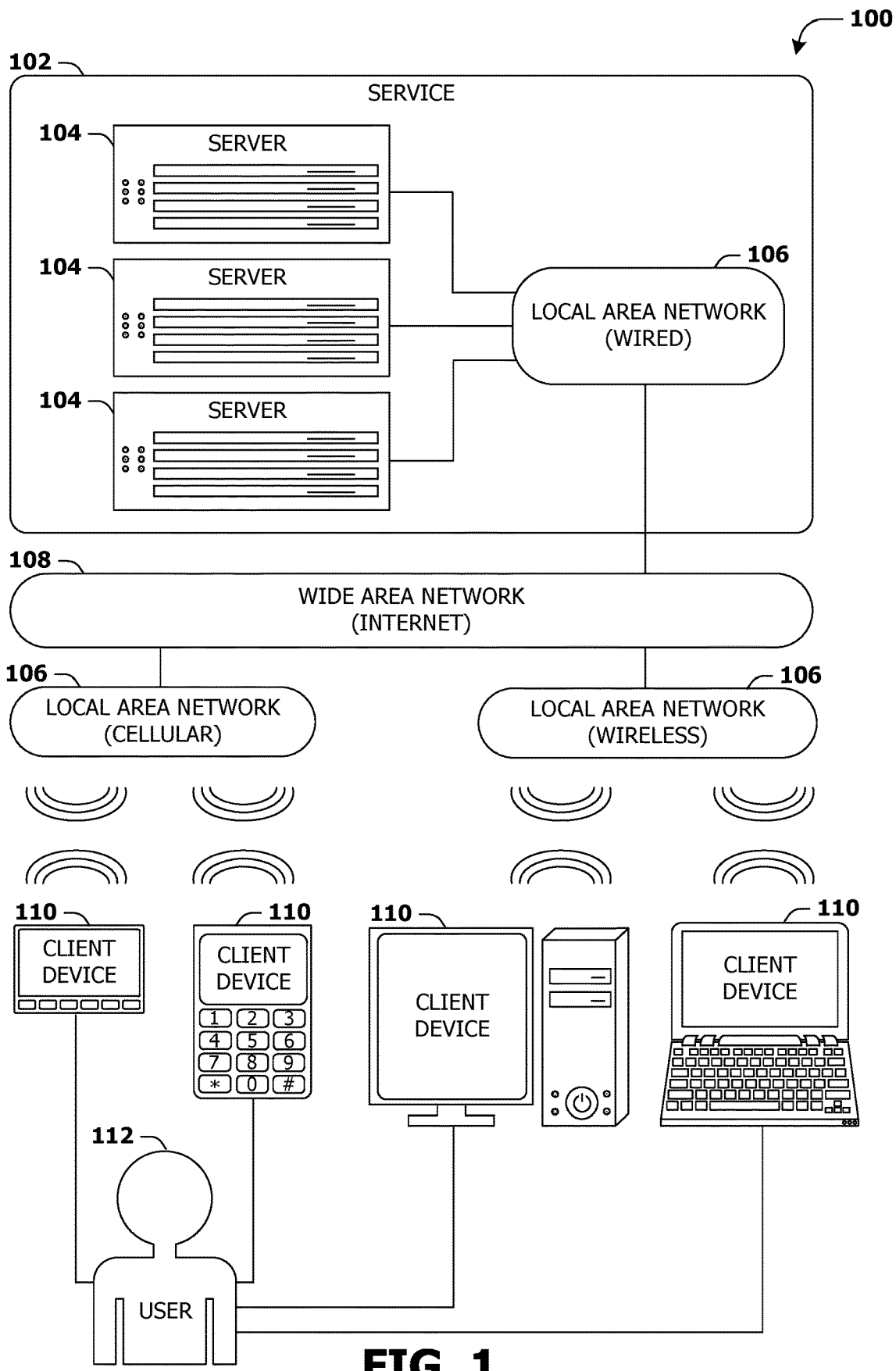
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, the local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and client devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of client devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective client devices 110 may communicate with the service 102 via various connections to the wide area network 108. As a first such example, one or more client devices 110 may comprise a cellular communicator, and may connect to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
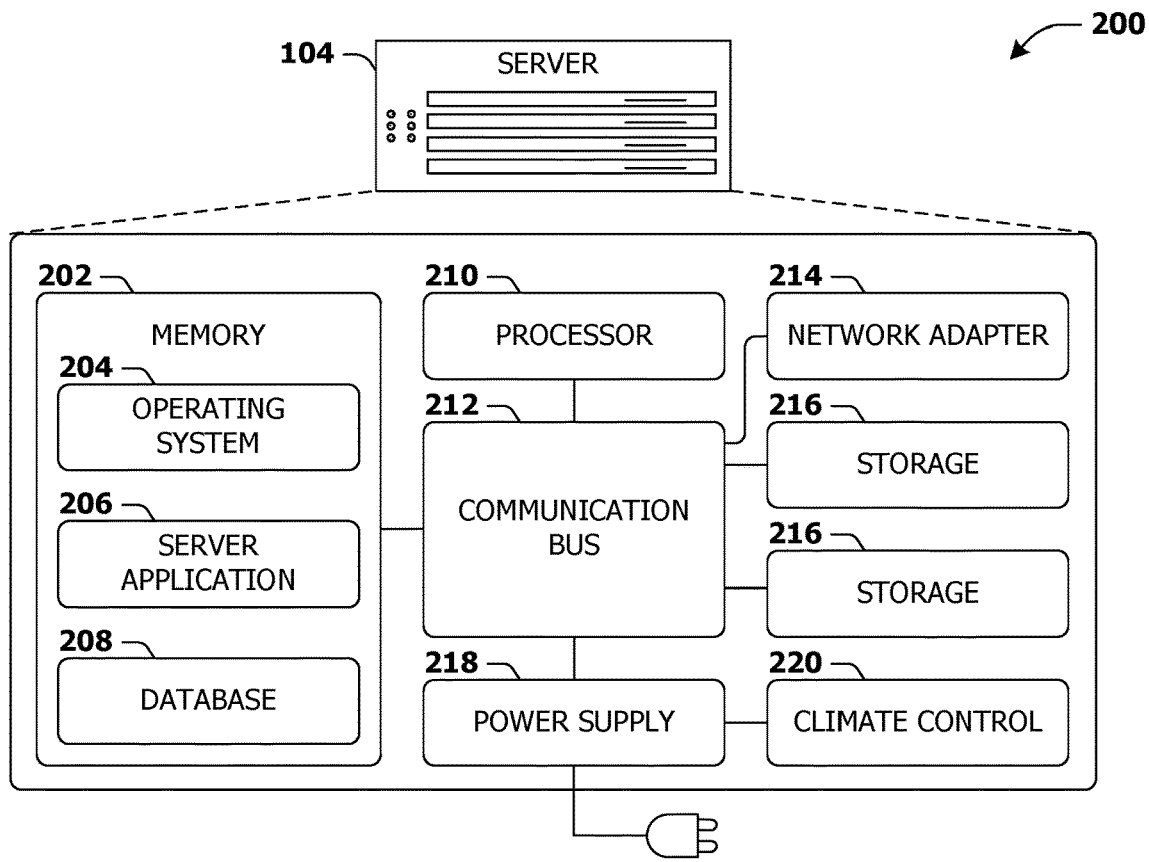
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectible to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, a communication bus 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Client Device Configuration

Figure 3:
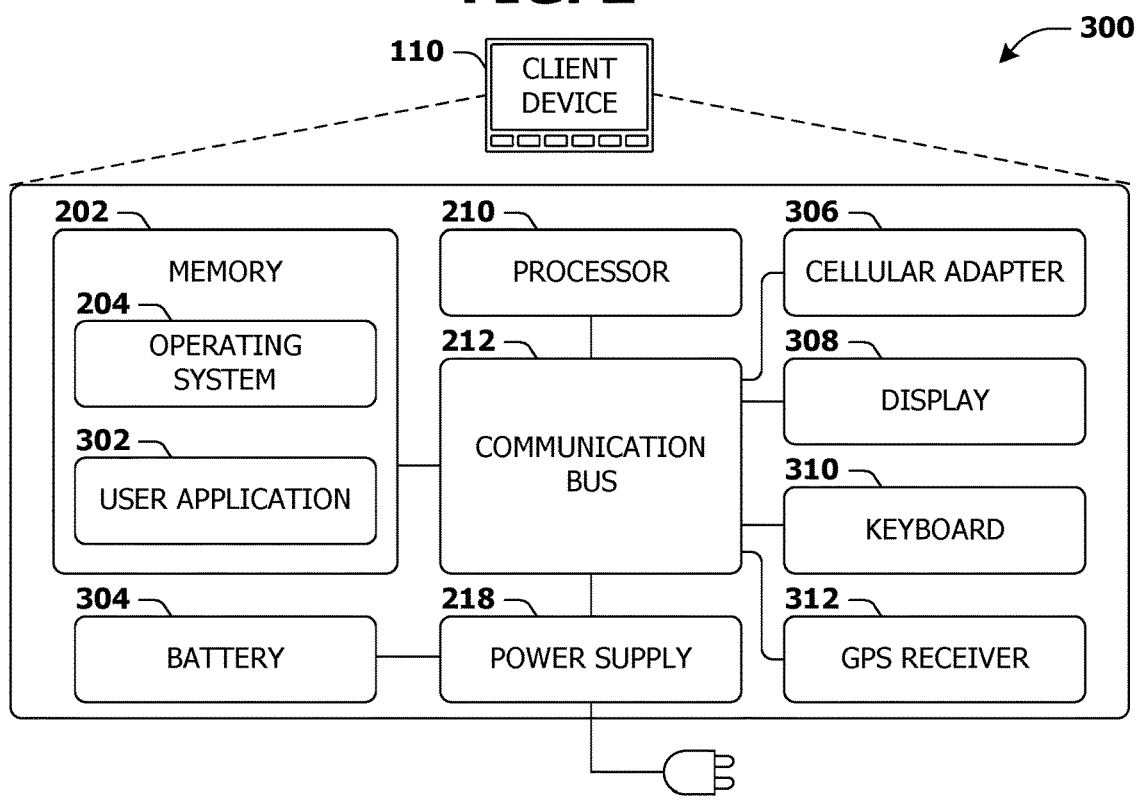
FIG. 3 is an illustration of a scenario involving an example configuration of a client that may utilize at least a portion of the techniques presented herein.

FIG. 3 presents a schematic architecture diagram 300 of a client device 110 operable by a user 112, whereupon at least a portion of the techniques presented herein may be implemented. Such client devices 110 may vary widely in configuration or capabilities, in order to provide a variety of functionality to the user 112. A client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A client device 110 may also serve the user 112 in a variety of roles, such as a workstation, kiosk, media player, gaming device, and/or appliance.

A client device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A client device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A client device 110 may also comprise a variety of peripheral components, such as a wired and/or wireless network adapter 214 connectible to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, and/or an compass, accelerometer, and/or gyroscope that detects a physical orientation of the client device 110. Other components that may optionally be included with the client device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

A client device 110 may comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A client device 110 may also comprise a dedicated and/or shared power supply 218 that supplies and regulates power for the other components, and/or a battery 304 that stores power for use while the client device 110 is not connected to a power source via the power supply 218. The client device 110 may also provide power to and/or receive power from other client devices 110.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may also include one or more servers that may locally serve the client device 110 and/or other client devices 110 of the user 112 and other individuals. For example, a locally installed webserver may provide web content in response to locally submitted web requests. Many such client devices 110 may be configured and/or adapted to utilize at least a portion of the techniques presented herein.

1.4. Content Insertion Into Hosting Items

Figure 4:
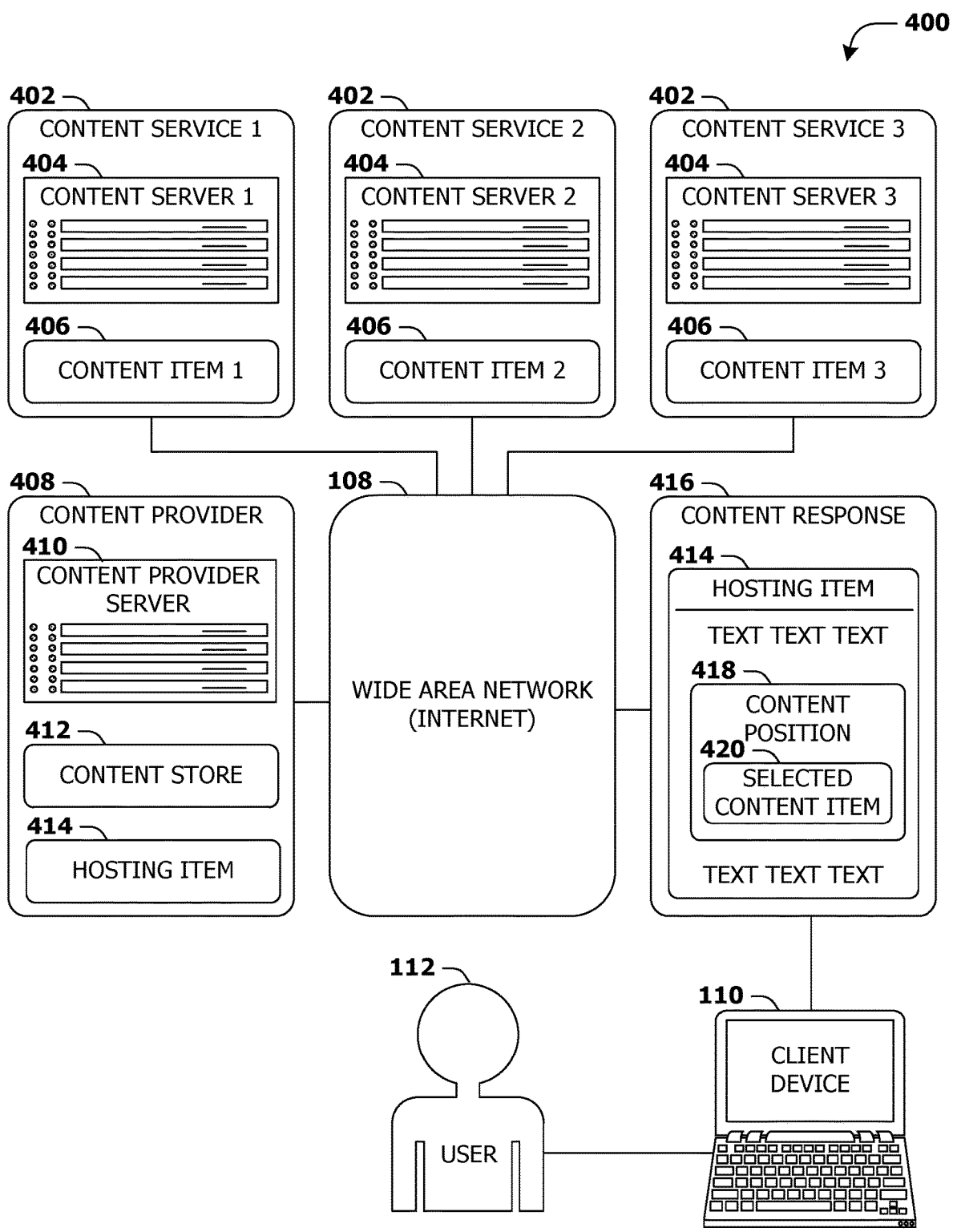
FIG. 4 is an illustration of a scenario involving an insertion of content provided by a content delivery network (CDN) into a hosting document, for presentation to a user.

FIG. 4 is an interaction diagram of a scenario 400 featuring a content delivery network, also sometimes referred to as a content distribution network or CDN. These terms generally refer to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

In the scenario 400 of FIG. 4, a set of content services 402 respectively comprise a content server 404 that provides access to a set of content items 406, such as text articles, pictures, video, audio, applications, data files, and output from devices such as cameras. A content provider 408 is provided, comprising a content provider server 410 that interacts with the content services 402 over a wide area network 108, such as the Internet, to index the content items 406 provided thereby. For example, the content provider server 410 may utilize a content crawler that iteratively explores the content services 402 and generates a content store 412, e.g., a collection of the content items 406 or references thereto, and/or a content index that enables rapid identification of particular content items 406. The content provider 408 may be deployed in a distributed manner across at least two content provider servers 410, which may be organized by role (e.g., a first content provider server 410 maintaining the content index 414, and a content provider server 410 interacting with users 112 and/or client devices 110) and/or geographically (e.g., various content provider servers 410 may be provided to service client devices 110 in different physical locations). Components may be duplicated within the content provider 408; e.g., two or more content provider servers 410 may be provided to facilitate the reliability, response time, and/or scalability of the content provider 408.

As further illustrated in the scenario 400 of FIG. 4, a user 112 of a client device 110 may engage in an interaction with the content provider 408 and/or content services 402 in the following manner. For example, the client device 110 may present a request for a hosting item 414 provided by the content provider 408, such as a web page identified by a uniform resource location (URL). In response, the content provider 408 may transmit a content response 416 that includes the hosting item 414, such as a set of text about a particular topic. The hosting item 414 may also include a content position 418 where a content item 406 is to be presented. The content item 406 may be selected by the content provider 408 from the content store 412, which may include and/or reference the selected content item 420 at a content position 418 within the hosting item 414. For example, the content provider 408 may provide the requested hosting item 414 as a source document, such as text with HTML markup, that includes a hyperlink element including a URL that references a content item 406 from one of the content service 402 to be inserted in the layout of the rendered document. While rendering the HTML document, the client device 110 may identify the URL within the hyperlink, retrieve the referenced content item from the hosting content service 402, and insert the retrieved content item at the content position 418 in the layout of the hosting item 414. Using this "on-demand" model, the client device 110 retrieves the selected content item 420 in response to the request by the user 112 for the hosting item 414, and thereby achieves the presentation of the selected content item 420 within the hosting item 414.

1.5. Content Item Insertion and Presentation Technical Disadvantages

Figure 5:
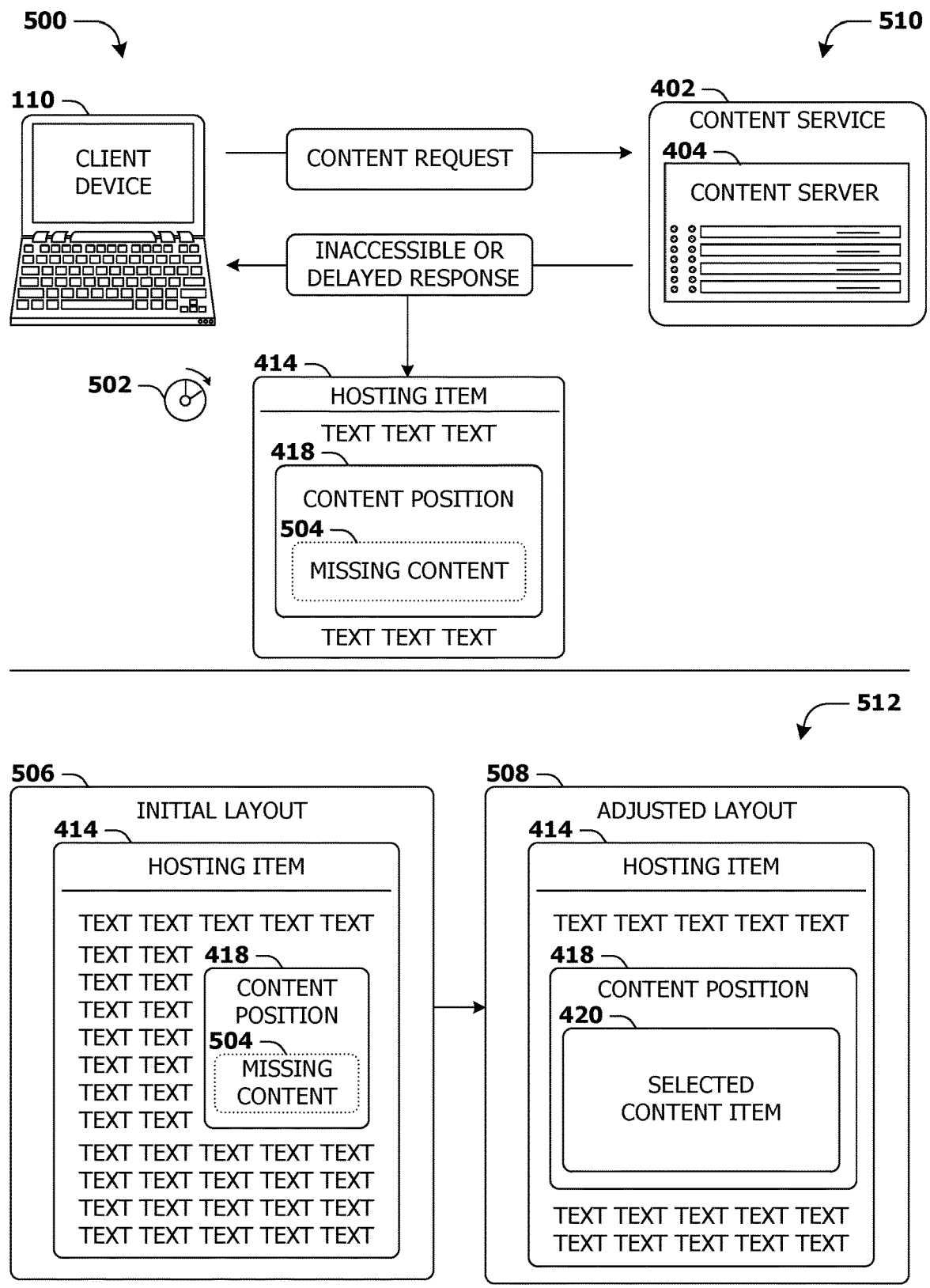
FIG. 5 is an illustration of a scenario involving some difficulties that may arise while inserting a content item into a hosting item for presentation to a user.

In the context of an "on-demand" retrieval of selected content items 420 for insertion into and presentation with hosting items 414, some technical disadvantages may arise. FIG. 5 presents a set of examples 500 that illustrate some such disadvantages that may arise in the context of an "on-demand" retrieval of selected content items 420 for insertion into and presentation with hosting items 414.

In a first example 510 presented in FIG. 5, the client device 110 may transmit the request for a selected content item 420 to a content service 402 in the course of rendering a hosting item 414 for presentation to a user 112. However, in some circumstances, the retrieval of the content item from the content service 402 for insertion into the hosting item 414 may entail a significant delay. As a first example, the content server 404 may be inaccessible to the client device 110, e.g., due to a failure of the network connection of the client device 110; a failure of the network connection of the content server 404; a failure of the content server itself 404; a network partition between the client device 110 and the content server 404; and/or miscommunication between the content service 402 and a content provider 408 that included a reference to the content item 406 within the hosting item 414, such as an outdated URL provided by the content provider 408 that no longer properly identifies the content item 406. As a second such example, the transmission of the selected content item 420 to the client device 110 may be protracted. For example, the selected content item 420 may exhibit a large data size; the bandwidth of the client device 110 and/or content server 404 may be limited; the content server 404 may be overloaded and slow to fulfill requests; and/or the transmission of the selected content item 420 may involve the initiation of a streaming channel between the client device 110 and the content server 404, for which a resolution of the details of the streaming service (such as quality-of-service assessment, the selection of a bit rate, the allocation of buffers, and agreement upon mutually compatible media codecs) may impose a considerable delay.

In these and other scenarios, the client device 110 may handle the delay and/or failure of the transmission of the selected content item 420 in various ways. For example, the client device 110 may delay the presentation of the entire hosting item 414 until the selected content item 420 is fully received, but such presentation may frustrate a user who is waiting to view the hosting item 414. Many users will respond to such delays by canceling the request for the hosting item 414, such as by refreshing the web page, navigating away from the web page, or closing the web browser. Such difficulties may arise even if the device 110 promptly receives the hosting item 414 and is only awaiting the selected content item 420.

In a second example 512 presented in FIG. 5, the client device 110 may choose an initial layout 506 for the hosting item 414, and, before the selected content item 420 has been fully received, may initially present the hosting item 414 according to the initial layout 506 with a placeholder for missing content. Upon fully receiving the selected content item 420, the client device 110 may insert the selected content item 420 into the placeholder of the content position 418 of the hosting item 414. However, such presentation may present an undesirable appearance and a poor user experience; e.g., in some cases, the hosting item 414 cannot be utilized without the missing content 504, such as where the missing content 504 comprises images that accompany the text of the hosting item 414. Moreover, as illustrated in FIG. 5, the properties of the selected content item 420 may entail an adjusted layout 508 that has been adapted to accommodate the selected content item 420. For example, the size and/or shape of the selected content item may have been unknown or incorrectly predicted while the client device 110 prepared the initial layout 506; and when the selected content item 420 is fully received, its size and/or shape may require a resizing, reorientation, and/or shifting of the content position 418 to accommodate the selected content item 420. This layout adjustment may alter the other content of the hosting item 414, such as displacing text or other resources. Such displacement may be frustrating to the user 112; e.g., the user 112 may have been reading the text of the hosting item 414 and/or interacting with the content of the hosting item 414 when the adjusted layout 508 was imposed, and the layout difference may cause the user 112 to lose the current reading location, and/or may disrupt the interaction of the user 112 with the elements of the hosting item 414 (e.g., moving a button that the user 112 is attempting to click to a different location within a web page).

As a third such example (not illustrated in FIG. 5), upon receiving a request for a content item 406 to be inserted into and presented with a hosting item 414, a content server 404 may endeavor to select from among all of the content items 406 stored by the content server 404. However, the time-sensitivity of such a request may mitigate against a sophisticated selection of which content item 406 to provide as the selected content item 420. Accordingly, the content service 402 may choose the selected content item 420 arbitrarily, e.g., as a random selection, or according to a basic heuristic such as the content item 420 having the highest current popularity. However, such selection may result in several disadvantages; e.g., the content server 404 may unintentionally choose a content item 406 that has previously been presented to the user 112 (possibly repeatedly), resulting in a frustrating and inefficient redundancy in the presentation of content items 406 to the user 112. Alternatively, an arbitrary selection of content items 406 may result in the insertion of a content item 406 that is not particularly relevant to the contents of the hosting item 414 and/or the user 112. These and other technical disadvantages may arise while retrieving and inserting a selected content item 420 into a hosting item 414 for presentation to a user 112.

2. Presented Techniques

Figure 6:
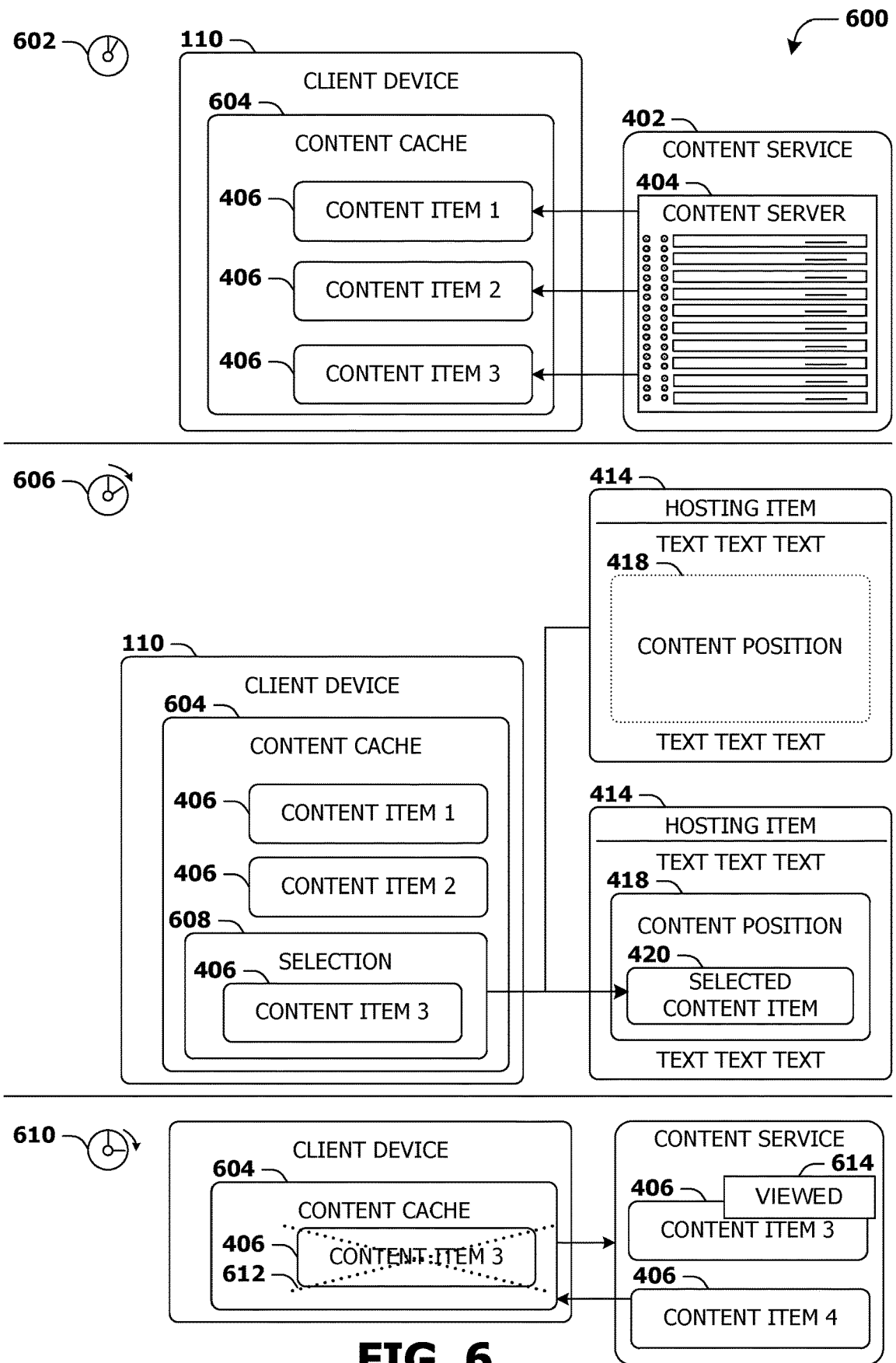
FIG. 6 is an illustration of a scenario involving a prefetching of content items for insertion into a hosting item in accordance with the techniques presented herein.

FIG. 6 is an illustration of a scenario 600 involving alternative techniques for inserting selected content items 420 into a hosting item 414 for presentation to a user 112 in accordance with the techniques presented herein.

In this scenario 600, at a first time 602, a client device 110 may prefetch content items 406 from a content service 402 into a content cache 604 stored on the client device 110, such as a region or data structure of a volatile or nonvolatile memory device. The client device 110 may retrieve a number of content items 406 from the content service 402, and may do so as a "prefetch" step, i.e., before and outside of the context of receiving a request from the user 112 for a particular hosting item 414.

At a second time 606 that is after the first time 602, the client device 110 may receive a request from a user 112 to present a hosting item 414, and may retrieve the hosting item 414 for presentation to the user. The client device 110 may also discover that the hosting item 414 includes a content position 418 for a content item 406, such as a visual region of a web page where a content image may be inserted. Rather than initiating an on-demand retrieval of the content item 406 from a content server 404, the client device 110 may select a content item 406 from among the content items 406 of the content cache 604. The client device 110 may then insert the selected content item 420 into the content position 418 of the hosting item 414, and present the hosting item 414 (including the selected content 420) to the user 112.

In some such scenarios, at a third time 610 after the selected content item 420 has been presented to the user 112, the client device 110 may evict 612 the selected content item 420 from the content cache 604, e.g., in order to avoid re-presenting the same selected content item 420 to the user 112 in a second, subsequent request for a hosting item 414, and/or to enable re-use capacity of the content cache 604 to store other prefetched content items 406. Additionally, the client device 110 may notify the content service 402 of the presentation of the selected content item 420 to the user 112. The content service 402 may respond by marking 614 the selected content item 420 as having been viewed by the user 112. During a subsequent request for content items 406 (including a subsequent request to prefetch content items 406 to replenish the content cache 604), the content service 402 may therefore avoid selecting and transmitting the selected content item 420 to the client device 110, which may reduce the inefficiency of re-transmitting the same selected content item 420 to the client device 110, including the transmission to a second client device 110 utilized by the same user 112. In this manner, the configuration of the client device 110 and/or the content server 404 may enable the prefetching of content items 406 into a content cache 604, for insertion into and presentation with hosting items 414, in accordance with the techniques presented herein.

3. Technical Effect

The techniques presented herein and illustrated in the scenario 600 of FIG. 6 may provide a variety of technical effects for the client device 110 and/or the content service 402.

As a first technical effect, the selection and insertion of prefetched content items 406 from a content cache 604 may enable a prompt presentation of the hosting item 414 by avoiding the delay involved in retrieving the selected content item 420 from the content service 402. The accelerated presentation of hosting items 414 may be of significant value, as users often exhibit very limited patience for content load times, and perceive the proficiency of the client device 110 and content service 402 in proportion with the expedient fulfillment of requests.

As a second technical effect, the selection and insertion of prefetched content items 406 into a hosting item 414 may avoid the use of empty placeholder regions of a hosting item 414 that reserve space while the client device 110 receives an on-demand content item 406. Empty placeholders may reduce the user experience by confusing and/or frustrating a user 112 viewing the hosting item 414 (e.g., the hosting item 414 may describe the content of the selected content item 420, and may be unusable until the selected content item 420 has been fully retrieved and inserted). Additionally, the avoidance of placeholders may also enable an avoidance of layout adjustments that alter the position of content within the hosting item 414, such as the displacement of text that causes the user 112 to lose a reading position within the hosting item 414. Such adjustments may also avoid spontaneous and unanticipated reorientation of the content of the hosting item 414, which may frustrate and confuse the user 112. The prefetching of such content items 406 into a content cache 604, in accordance with the techniques presented herein, enables a ready availability of such content items 406 for prompt later insertion into hosting items 414.

As a third technical effect, the selection and insertion of prefetched content items 406 may enable a completion of the presentation of the hosting item 414 (including the selected content item 420) even if the connectivity between the client device 110 and the content service 402 is limited or unavailable. For example, the user 112 may request to view the hosting item 414 while the client device 110 and/or the content server 404 are offline, or while bandwidth limitations entail a protracted delay in the insertion of the selected content item 420. The availability of content items 406 via prefetching and storage in a content cache 604 may enable the fulfillment of such requests irrespective of the current connectivity and/or bandwidth of the client device 110 and the content service 402.

As a fourth technical effect, the prefetching of content items 406 into a content cache 604 may enable a more sophisticated selection of content items 406 to be inserted into hosting items 414. For example, the client device 110 may populate the content cache 604 only with content items 406 that are determined to have not yet been presented to the user 112, such as content items 406 that the user 112 has not previously viewed on the client device 110, and/or that are relevant to the interests of the user 112. Such evaluation may be more thorough and comprehensive when performed on a time-unrestricted basis as a prefetch step, as compared with content selection responsive to a request for a hosting item 414 that demands expedience in the fulfillment of the request. Such prefetching may therefore reduce the redundant transmission of content items 406 to the client device 110 that the user 112 has previously viewed, or that are not relevant to the user 112 and/or the hosting item 414 (such as may result from a random or otherwise arbitrary selection of content items 406 from a content server). Such redundancy may also present a technical advantage to the content service 402, which may reduce the transmission of content items to users 112 that are redundant and undesired.

As a fifth technical effect, the prefetching of content items into a content cache 604 may enable various forms of optimization in the transmission of content items 406 to the client device 110. As a first such example, it may be more efficient for the client device 110 to retrieve content items 406 when network bandwidth is plentiful and/or unmetered (such as a high-bandwidth home network connection) than when network bandwidth is limited and/or metered (such as a mobile network connection). A prefetching of content may be initiated based on the availability of bandwidth, rather than depending upon potentially limited network connectivity during on-demand retrieval of content items. As a second such example, it may be more efficient for the client device 110 to retrieve content items when processor capacity, memory, and power are available (e.g., when the client device 110 is idle and/or plugged into a wall outlet) than depending upon such properties in an on-demand context (e.g., when the user requests the hosting item 414 at a point when the client device 110 is otherwise heavily utilized and/or operating on battery power). These and other technical advantages may be exhibited by embodiments of the techniques presented herein.

4. Example Embodiments

Figure 7:
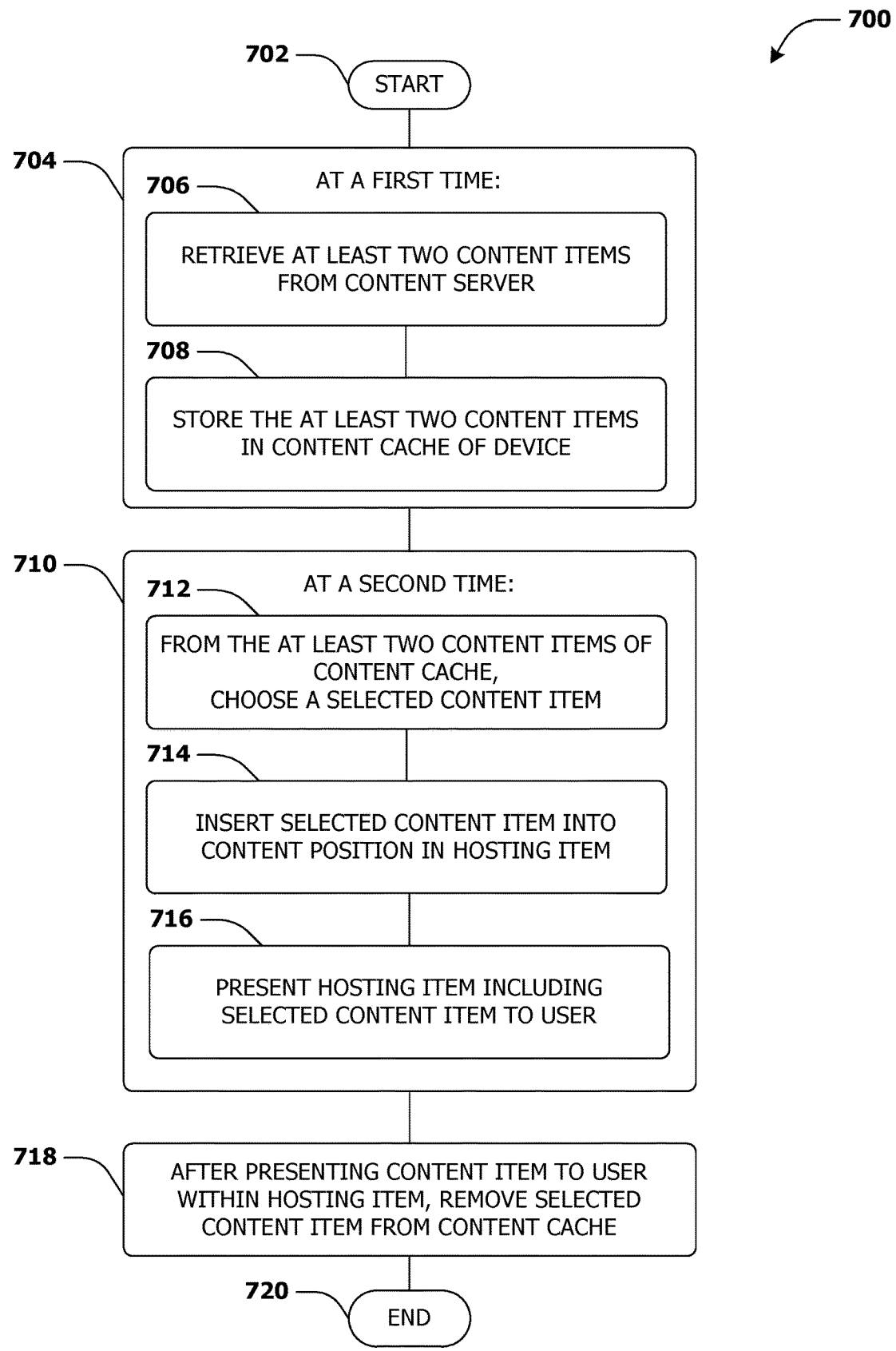
FIG. 7 is an illustration of a scenario featuring an example method of prefetching content items into a content cache, for presentation to a user within hosting items, in accordance with the techniques presented herein.

FIG. 7 presents an illustration of a first example embodiment of the techniques presented herein, illustrated as an example method 700 of presenting prefetched content items 406 to a user 112. The example method 700 may be implemented, e.g., as instructions stored in a memory (e.g., a hard disk drive, a solid-state storage device such as a flash memory device, or a magnetic or optical disc) that, when executed on a processor of a client device 110, cause the client device 110 to operate according to at least a portion of the techniques presented herein. The example method 700 begins at 702 and comprises, at a first time 704, retrieving 706 at least two content items 406 through a content server 402, and storing 708 the at least two content items 406 in a content cache 604 of the client device 110. The example method 700 further comprises, at a second time 710 after the first time 704, responsive to a request from the user 112 to present a hosting item 414, choosing 712 a selected content item 420, from the at least two content items 406 in the content cache 604; insert 714 the selected content item 420 into a content position 418 in the hosting item 414; and presenting 716 the hosting item 414 including the selected content item 420 to the user 112. The example method 700 also comprises, at a third time after presenting the content item 420 to the user 112 within the hosting item 414, removing 718 the selected content item 420 from the content cache 604. In this manner, the example method 700 achieves the presentation of the content items 406 to the user 112 in accordance with the techniques presented herein, and so ends at 720.

Figure 8:
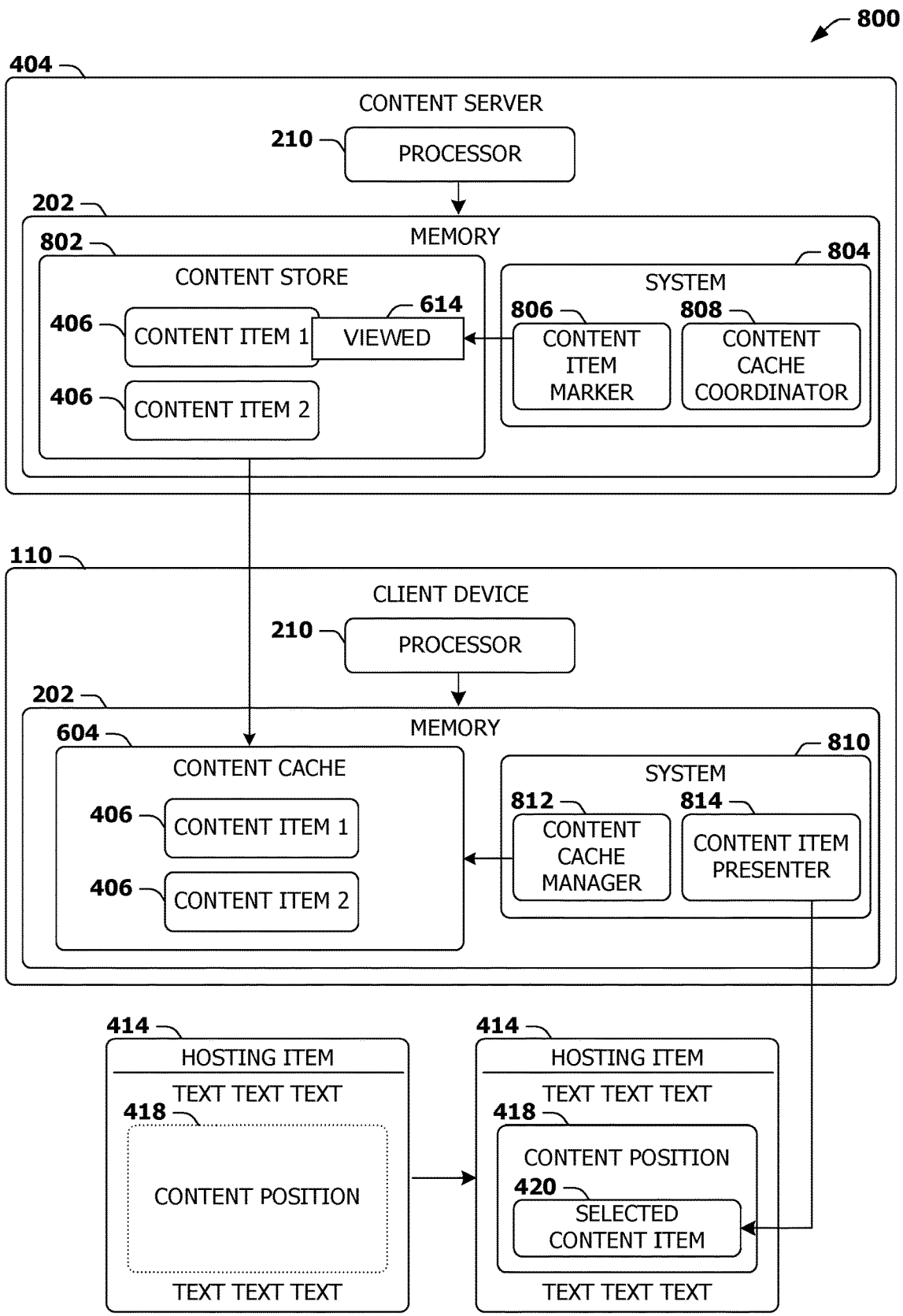
FIG. 8 is an illustration of a scenario featuring an example server and example client device that coordinate to present content items in hosting items in accordance with the techniques presented herein.

FIG. 8 presents an illustration of a scenario 800 involving a further example embodiments of the techniques presented herein, including a content server 404 that coordinates with a client device 110 to present prefetched content to a user 110. The content server 404 and/or client device 110 may comprise a processor 210, and a memory 202 (e.g., a hard disk drive, a solid-state storage device such as a flash memory device, or a magnetic or optical disc) storing instructions that provide the components of an example system that causes the content server 404 and/or client device 110 to operate according to the techniques presented herein.

As a first such example illustrated in the scenario 800 of FIG. 8, the client device 110 may store, in the memory 202, a first example system 810 that causes the client device 110 to present content items 406 that are prefetched from the content server 404, and stored in a content cache of the client device 110. The first example system 810 embodied by the instructions stored in the memory 202 of the client device 110 may include a content cache manager 812 that, at a first time, retrieves at least two content items 406 through the content server 404, and stores the at least two content items 406 in the content cache 604; and, at a third time after a selected content item 420 has been presented to the user 112 within a hosting item 414, removes the selected content item 420 from the content cache 604. The first example system 810 may also include a content item presenter 814 that, at a second time after the first time and responsive to a request from the user 112 to present a hosting item 414, chooses a selected content item 420 from the at least two content items 406 in the content cache 604; inserts the selected content item 420 into a content position 418 in the hosting item 414; and presents the hosting item including the selected content item to the user 112. The content item presenter 814 may also transmit to the content server 404 a notification that the selected content item 420 has been presented to the user 112 within the hosting item 414.

As a second such example illustrated in the scenario 800 of FIG. 8, the content server 404 may store, in the memory 202, a second example system 804 that causes the content server 404 to transmit content items 406 from a content store 802 to the client device 110. The second example system 804 may comprise a content item marker 806, which, responsive to a notification from the device of a presentation of a presented content item to the user, marks 614 the presented content item 406 as having been presented to the user 112. The second example system 804 may also comprise a content cache coordinator 808, which, responsive to a prefetch request from the client device 110 for content items 406 to be presented to the user 112, chooses at least one selected content item 406 from the content store 802 that has not been marked 614 as having been previously presented to the user 112, and transmit the at least one selected content item 420 to the client device 110 for presentation to the user 112. In this manner, the example systems implemented on the client device 110 and/or the content server 404 to coordinate the delivery and presentation of prefetched content items to the user 112 using a content cache 604 in accordance with the techniques presented herein.

Figure 9:
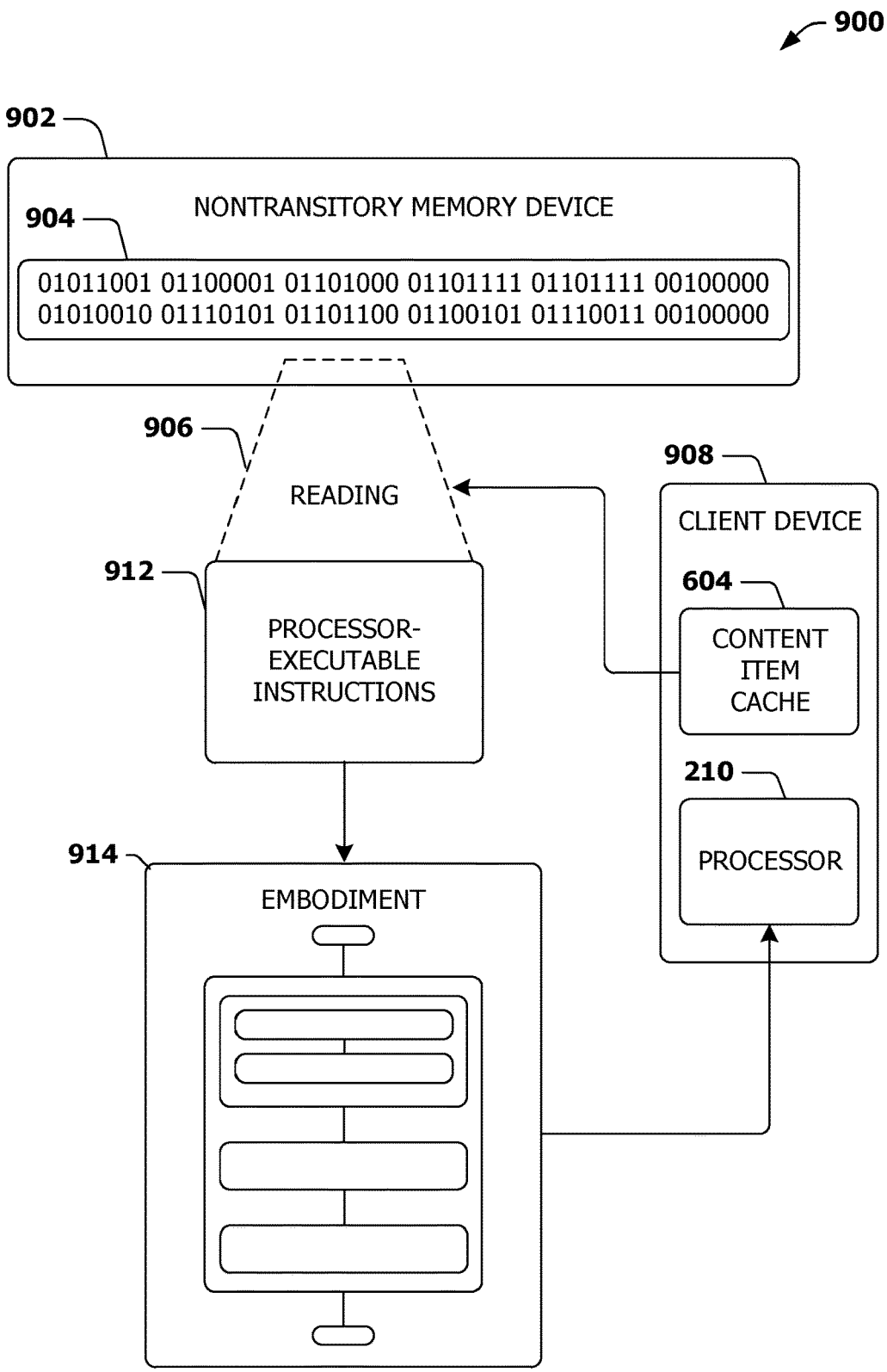
FIG. 9 is an illustration of a scenario featuring an example nontransitory memory device that causes a device to prefetch content items into a content cache, for presentation to a user within hosting items, in accordance with the techniques presented herein.

FIG. 9 is an illustration of a scenario 900 involving a third example embodiment of the techniques presented herein, comprising an example nontransitory memory device 902, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 901 of a device 908 (e.g., a read head of a hard disk drive, or a read operation invoked on a solid-state storage device), express processor-executable instructions 912. The processor-executable instructions 912, when executed on a processor 916 of the device 908, cause the device 908 to prefetch content items 406 into a content cache 604, and to insert a selected content item 406 from the content cache 604 into a hosting item 414 for presentation to a user 112, in accordance with the techniques presented herein. In another example, the computer-executable instructions may implement one or more components of a system, such as the first example system 810 of FIG. 8 and the second example system 804 of FIG. 8, such that when the instructions are executed on a processor of a client device 110 and/or content server 404, implement the systems that cause such devices to operate in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 700 of FIG. 7; the example devices and systems of FIG. 8; and the example nontransitory memory device 902 of FIG. 9) to confer individual and/or synergistic advantages upon such embodiments.

5.1. Scenarios

The techniques presented herein may be utilized in a variety of scenarios.

As a first such example, the techniques presented herein may be utilized with a variety of client devices 110, such as workstations, laptop and palmtop computers, mobile phones, tablets, game consoles, media players, appliances, wearable devices, and vehicle control systems. Such client devices 110 may also be owned and/or administrated by the user 112, or may only be in temporary use by the user 112, such as a public display device that presents content to the user 112. The client device 110 may also comprise a collection of such client devices 110, such as a device "mesh" of devices that the user 112 utilizes together, including a wristwatch, a mobile phone, and a tablet.

As a second such example, the techniques presented herein may be utilized with various types of content items 406 provided by various types of content services 404, such as text, images, videos, audio, data sets, and applications. Such content items 406 may also present various types of content, such as entertainment, news or informational material, educational or training content, and data or reference materials. Such content items 406 may also be personal to the user 112, such as a user's personal photo library, or may be distributed publicly, such as images selected from a publicly accessible image library. The techniques presented herein may also be provided by a variety of content services 402, such as freely available content services (e.g., a public library); proprietary, subscription-based content services (e.g., a subscription media library); and private content services (e.g., content provided exclusively for the user 112).

As a third such example, the techniques presented herein may insert content items 406 into a variety of hosting items 414, such as web pages; static or dynamic documents; encapsulating media objects, such images, videos, and sound recordings; and applications and user interfaces, such as game applications. These and other scenarios may enable a suitable application of the techniques presented herein.

5.2. Content Item Selection

A second aspect that may vary among embodiments of the techniques presented herein involves the selection of content items, from the entire set of content items 406 available in a content store 802 of a content service 402, for prefetching by the client device 110, storage in a content cache 604, and later insertion into a content position 418 of a hosting item 414.

As a first such example, content items may be selected and prefetched according to information about the user 112. For example, information about the user's interests and demographics may be retrieved from a user profile generated by the user 112; from the user's web browsing history; and/or the user's interaction with a service, such as purchase history through an e-commerce site. Content items 406 may be selected for prefetching into the content cache 604 that are relevant to the user's interests and demographics.

As a second such example, content items may be selected and prefetched according to the user's current context, such as the user's current location or route, as detected by a global positioning system (GPS) receiver or navigation device; the user's current conversation topics, such as the contents of messages exchanged between the user 110 and other individuals; and the interaction of the user 110 with the user device 112, such as the user's current music playlist. For example, retrieving the content items 406 from the content server 404 may further comprise identifying a context indicator of a current context of the user 110 at the first time, and retrieving, through the content server 404, at least two content items 406 that match the current context of the user 110 at the first time.

As a third such example, additional signals may be utilized to select the content items 406 that are prefetched into the content cache 604, such as the static and/or trending popularity of topics within a population, such as the user's social network. Many such techniques may be utilized to select the content items 406 from the content store 802 of a content server 404, for prefetching and storage in the content cache 604 of the client device 110, in accordance with the techniques presented herein.

5.3. Content Prefetching and Caching

A third aspect that may vary among embodiments of the techniques presented herein involves the manner, including the timing, of prefetching content items 406 into the content cache 604 of the client device 110.

Figure 10:
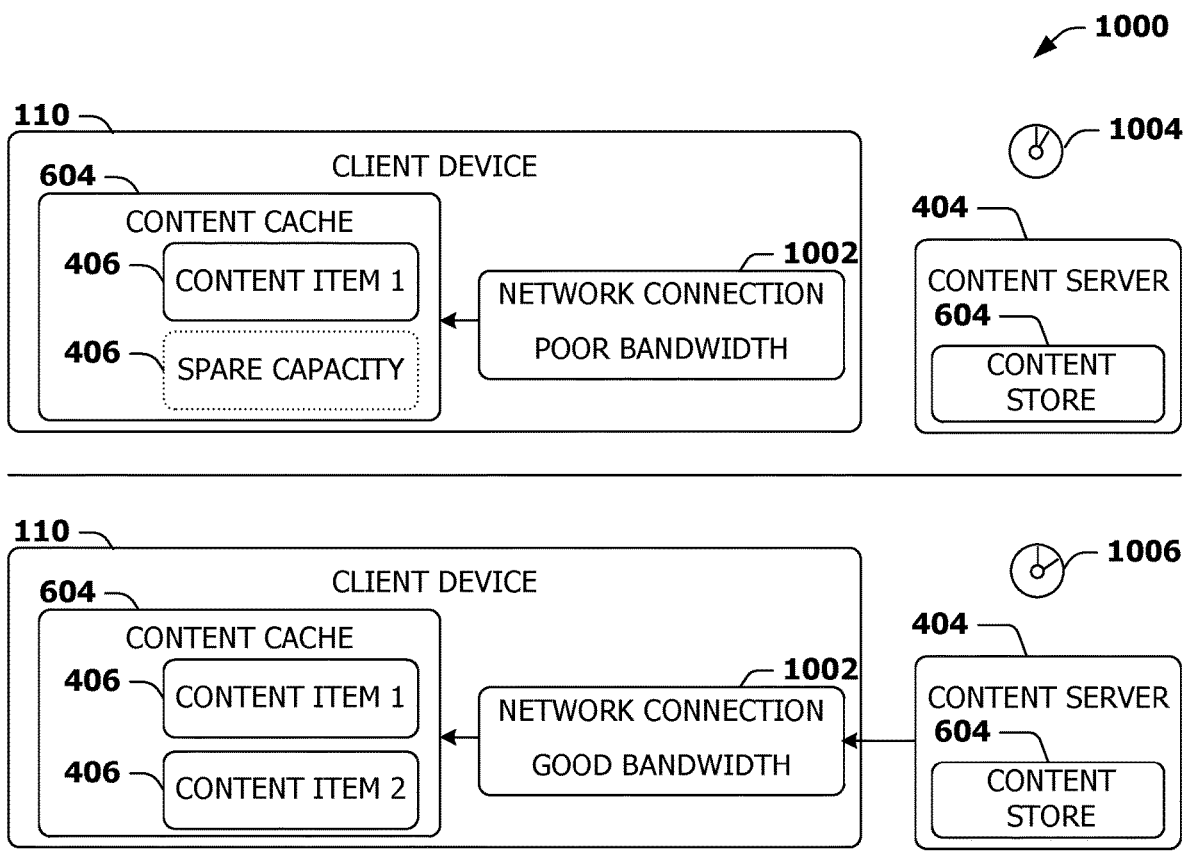
FIG. 10 is an illustration of a scenario featuring a selective prefetching of content items into a content cache in accordance with the techniques presented herein.

FIG. 10 presents an illustration of a first variation of this third aspect, wherein the client device 110 retrieves content items 406 over a network connection 1002 that is constrained by a variable bandwidth. The retrieval of content items 406 through the content server 404 may be achieved by comparing the variable bandwidth of the network connection 1002 with a bandwidth threshold, and retrieving content items 406 through the content server 404 only when the variable bandwidth of the network connection 1002 exceeds the bandwidth threshold. For example, at a first time 1004, when the client device 110 exhibits a poor bandwidth in network connection 1002 with the content server 404, the client device 110 may refrain from retrieving content items 406 into the content cache 604, even if spare capacity for content items 406 exists in the content cache 604; and at a second time 1006, when the client device 110 exhibits good bandwidth in the network connection 1002 to the content server 404, the client device 110 may proceed with prefetching content items 406 into the content cache 604.

As a second variation of this third aspect, the respective content items provided by the content server exhibit a transfer constraint. For example, a first media object may present a very large data size, such as a high-definition video, while a second media object may present a more limited data size, such as an image. The retrieval of the content items 406 through the content server 404 may be achieved by comparing the transfer constraints of the respective content items 406 with a variable bandwidth of a network connection of the client device 110, and retrieving, through the content server 404, only the content items 406 for which the variable bandwidth of the network connection satisfies the transfer constraint of the content item 406. For example, the high-definition video may be retrieved only when network bandwidth is plentiful, while small images may be retrieved even when network bandwidth is limited. Moreover, the transmission may be adapted to the variable network bandwidth of the client device 110; e.g., if the network bandwidth drops during the transfer of a large content item 406, the client device 110 may cancel the transfer 110, or may retain the retrieved portion and postpone a transmission of the remainder until network bandwidth is again plentiful. Other such network constraints may include, e.g., metering of the network connection (such as a per-block data charge), and/or capping of the network connection (such as a maximum data transfer over a particular period of time).

As a third variation of this third aspect, the prefetching of content items 406 into the content cache 604 may be selected based on other factors of the client device 110 (e.g., processor load, storage space, and/or power capacity, such as whether the device powered by a wall outlet, a battery with high reserve capacity, or a battery with limited capacity), and/or a content server 404 (e.g., the current service load of the content server 404 and/or the availability of content items 406). Many such variations in the manner of prefetching content items 406 into the content cache 604 may be included in variations of the techniques presented herein.

5.4. Content Item Presentation

A fourth aspect that may vary among embodiments of the techniques presented herein involves the selection and presentation of selected content items 420 into a content position 418 of a hosting item 414.

Figure 11:
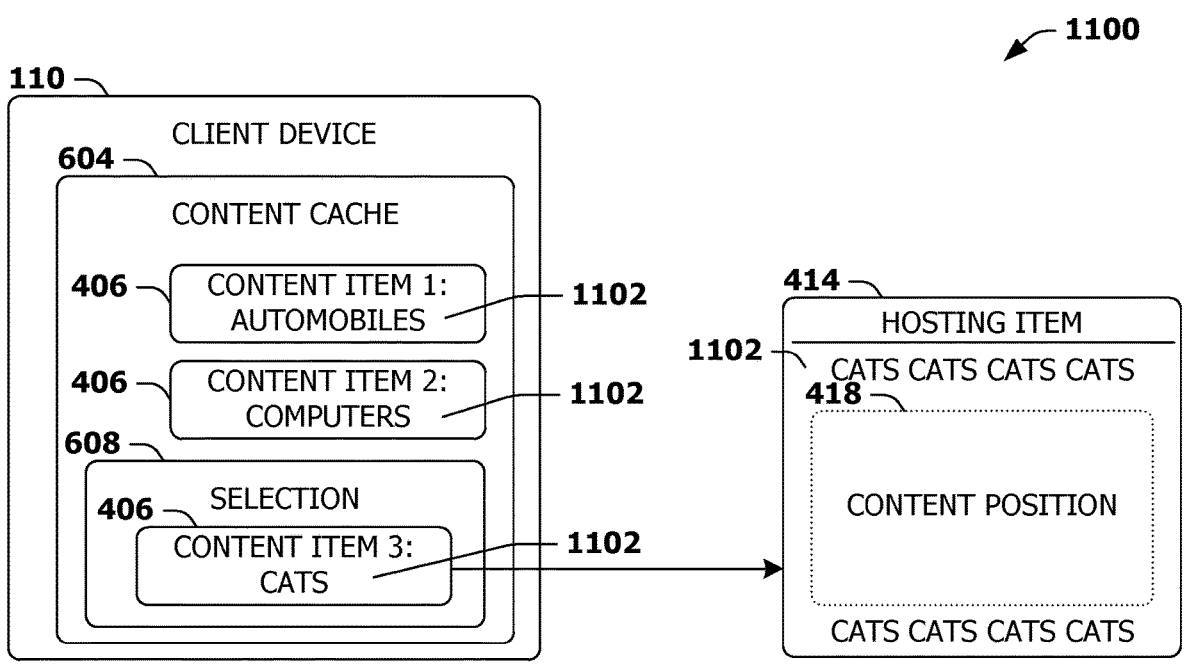
FIG. 11 is an illustration of a scenario featuring a selection among content items in a content cache for insertion into a hosting item in accordance with the techniques presented herein.

FIG. 11 presents an example scenario 1100 featuring a first variation of this fourth aspect, wherein the selected content item 420 is selected from the content cache 604 according to a context of the hosting item 414. For example, various content items 406 in the content cache 604 may relate to various topics 1102, such as automobiles, computers, and cats. In order to select a content item 406 for insertion into a particular hosting item 414, the client device 110 may evaluate the hosting item 414 to determine the context of the content position 418 within the hosting item 414 (e.g., the topics to which the hosting item relates). If the topic 1102 of the hosting item 414 relates to the topic 1102 of a particular content item 406, the selection 608 of this content item 406 for insertion into the content position 418 of the hosting item 414 may enable a contextually consistent presentation of content to the user 112.

As a second variation of this fourth aspect, the content position 418 of the hosting item 414 may exhibit a content position constraint, such as a desired size limit, or whether or not the content item 406 inserted into the content position 418 is more desirably static, dynamic, and/or interactive. The client device 110 may choose the selected content item 420 by comparing the content items 406 stored in the content cache 604 with the content position constraint of the hosting item 414 (e.g., comparing the sizes and media types of the content items 406 with the content position 418 of the hosting item 414), and choosing a selected content item 420 that satisfies the content position constraint of the hosting item 414.

As a third variation of this fourth aspect, the content item 406 may be selected for insertion into a content position 418 according to a context indicator of a current context of the user 112 at the second time. For example, the time, place, circumstances, or conversation topics of the user 112 at the time of presenting the hosting item 414 may be determined, and the selected content item 420 may be selected from the content cache 604 that matches the current context of the user 112 at the second time.

As a fourth variation of this fourth aspect, the presentation of the hosting item 414 may be achieved according to the ready availability of the prefetched content item 406. As one such example, rather than incrementally presenting a hosting item 414 with an initial layout 506 and then presenting an adjusted layout 508 that is adapted to inset the selected content item 420, the client device 110 may fully render the hosting item 414, including the insertion of the selected content item 420 into the content position 418, before the hosting item 414 to the user 112 (i.e., refraining from presenting the hosting item 414 in an incomplete state). Such presentation may avoid the displacement of content within the hosting item 414 that may confuse or frustrate the user 112. Many such variations in the selection and insertion of content items 406 into hosting items 414 may be included in variations of the techniques presented herein.

5.5. Content Cache Management

A fifth aspect that may vary among embodiments of the techniques presented herein involves the management of the content cache 604, and in particular the eviction of prefetch content items 406 from the content cache 604. Such eviction may be significant, e.g., for removing content items 406 that the user 112 has viewed or does not wish to view, and/or for reallocating space for additional content items 406 that may be more desirable to present to the user 110.

As a first variation of this fifth aspect, a selected content item 406 may be evicted from the content cache 604 upon detecting a completion of a presentation of the selected content item 420 to the user 112. For example, if the user 112 completes a viewing of a video content item within a hosting item 414, the content item 406 may be removed from the content cache 604 in order to avoid presenting the same content item 406 to the user 112 in a subsequently presented hosting item 414. As a further variation, responsive to presenting the selected content item 420 to the user 112, the client device 110 may notify the content server 404 that the selected content item 420 has been presented to the user 112, which may enable the content server 404 to avoid retransmitting the selected content item 420 to the client device 110 in a subsequent content prefetch. Conversely, if the user 112 does not complete a viewing of the video content item, the content item 406 may be retained in the content cache 604 in order to enable a second attempted presentation at a later time.

As a second variation of this fifth aspect, a selected content item 420 may be evicted from the content cache 604 in response to a cancellation request from the user 406 to cancel a presentation of the selected content item 420. For example, if the user 112 chooses to skip or cancel the presentation of a video content item 406 within a hosting item 414, the client device 110 may interpret the cancellation as an expression of dislike, and may therefore remove the content item 406 from the content cache 604 to avoid presenting the undesirable video content item 406 to the user 112 at a later time.

Figure 12:
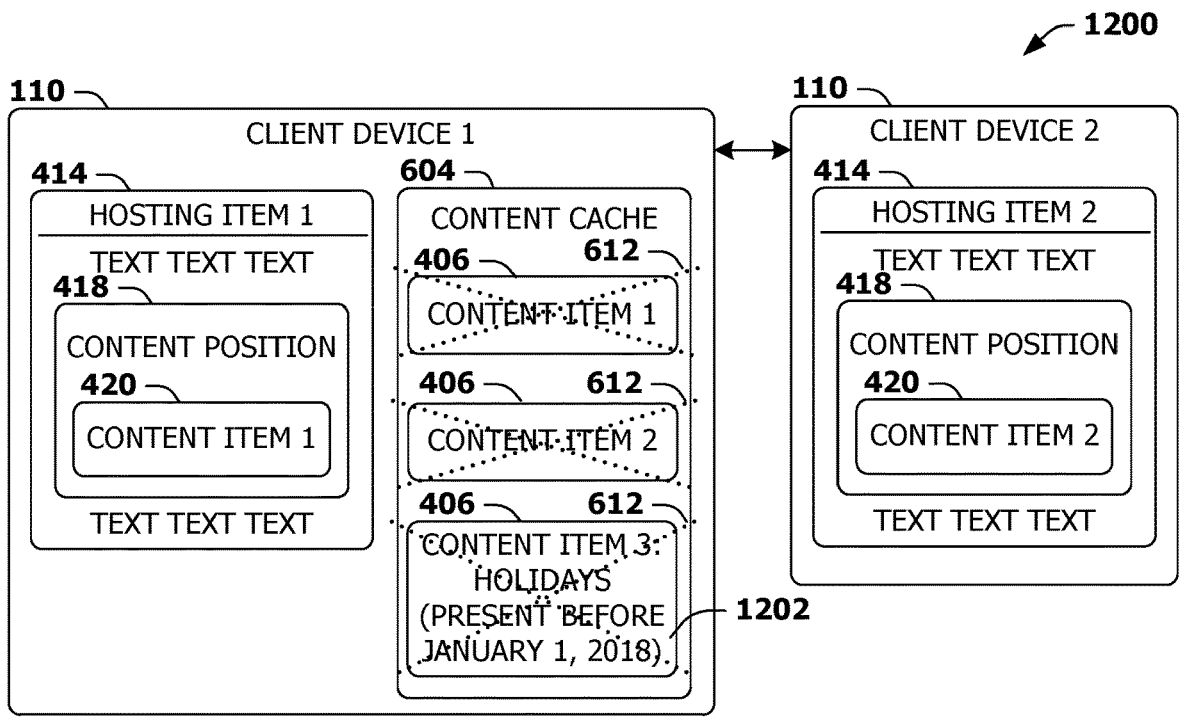
FIG. 12 is an illustration of a scenario featuring the eviction of content items from a content cache in accordance with the techniques presented herein.

FIG. 12 presents an illustration of a scenario 1200 featuring further variations of the management of the client cache 604. In this scenario 1200, a first eviction 612 is performed when a selected content item 420 is presented within a first hosting item 414 on a first client device 110. In addition, the user 112 may also view hosting items 441 on a second client device 110, which may include a presentation of a second content item 420 that is also stored in the content cache 604 of the first client device 110. Accordingly, the first client device 110 and the second client device 110 may maintain communication about the presentation of content items 406, such that the first client device 110 may receive a notification from the second client device indicating a presentation on the second client device 110 of a second selected content item 420 within a second hosting item 414 to the user 112. The first client device 110 may therefore evict 612 the second content item 406 from the content cache 604, even though the second content item 406 has not been selected for viewing within a hosting item 414 of the first client device 110. Conversely, upon presenting the first selected content item 420 within the first hosting item 414, the first client device 110 may notify the second client device 110 of the presentation of the first selected content item 420, in order to enable the second client device 110 to evict the first content item 406 from its content cache 604.

As a fourth variation of this fifth aspect that is illustrated in the scenario 1200 of FIG. 12, respective content items 406 of the content cache 604 may exhibit a presentation condition 1202, such as a time period within which the content item 406 is to be presented. If the content item 406 remains in the content cache 604 at the expiration of the presentation condition 1202 (e.g., when a designated time period has expired), the client device 110 may evict the prefetched content item 406 from the content cache 604, even if the content item 406 has not yet been presented to the user 112 within a hosting item 414. The client device 110 may (e.g., periodically) evaluate the presentation conditions 1202 of the prefetched content items 406 in the content cache 604 to identify an expired content item 406, and, responsive to identifying an expired content item, evict 612 the expired content item 406 from the content cache 604.

As a fifth variation of this fifth aspect, the client device 110 may allow users 112 to designate particular content items 406 for saving, in case the user 112 wishes to view the content item 406 at a later time or in a different context, and/or share the content item 406 with others, such as in a social media network. For example, responsive to a save request from the user 112 to save a selected content item 420, the client device 110 may retain the selected content item 406 in the content cache 604, despite the completion of the presentation of the content item 406 to the user 112, and/or despite the expiration of presentation conditions 1202 on the content item 406. Responsive to a saved content items request from the user 112 to identify the saved content items 406, the client device 110 may present to the user 112 a list of the content items 406 for which the user 112 previously initiated the save request; and responsive to a selection by the user of a saved content item 406, the client device 110 may present the content item 406 to the user 112. Many such variations may be utilized in the management of the content cache 604 in accordance with the techniques presented herein.

5.6. Device Presentation Selection

A sixth aspect that may vary among embodiments of the techniques presented herein involves the selection, and in some cases recommendation, of a particular device on which a prefetched content item 406 is to be presented to the user 112. In some scenarios, a particular content item 406 may be presented to the user 112 on a client device 110, but may also be presented to the user 112 on other devices, such as a mobile phone, tablet, projector, and wearable device that comprise a device "mesh" of the user's devices. The client device 110 may assist the user in the comparison and selection of which device, among these several devices, is to be used to present a particular content item 406 to the user 112.

Figure 13:
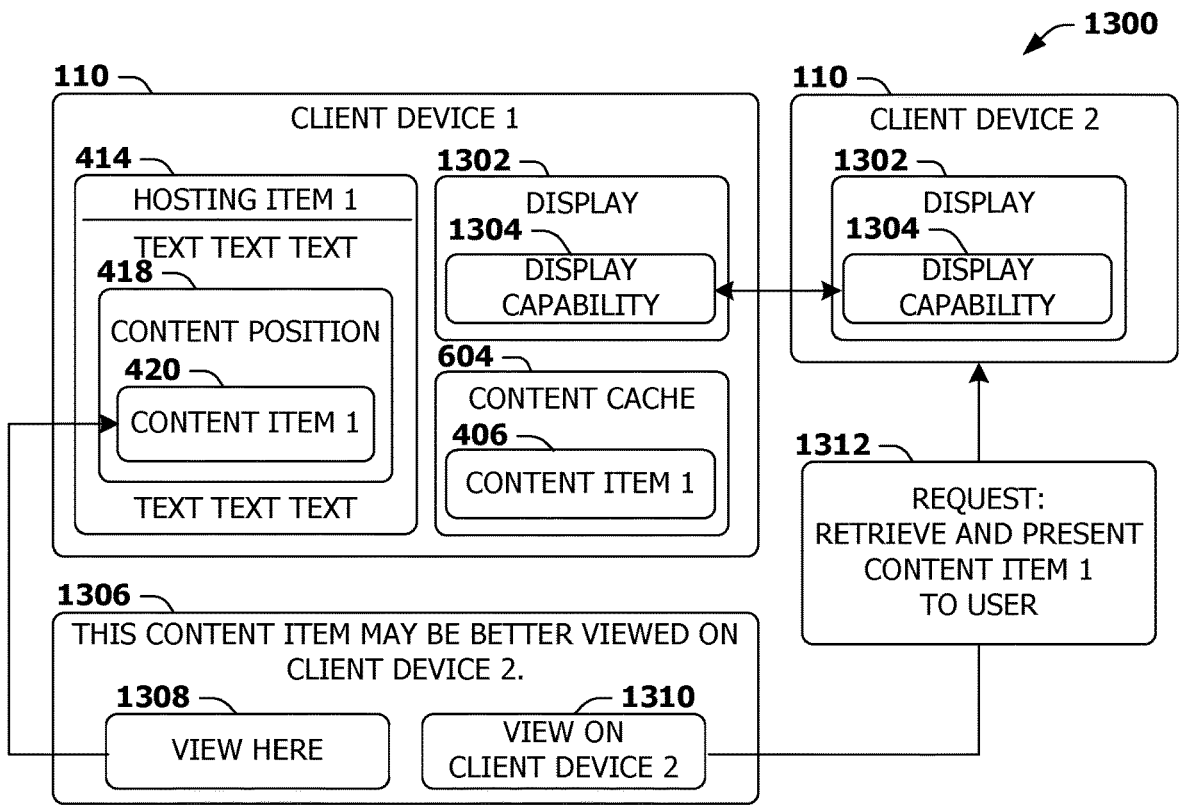
FIG. 13 is an illustration of a scenario featuring a comparison of presentation capabilities of various client devices, and a recommendation to present a content item on a second client device, in accordance with the techniques presented herein.

FIG. 13 presents an illustration of an example scenario 1300 involving the presentation of a content item 406 by a client first device 110 to a user 112 who also utilizes a second client device 110. In this example scenario 1300, respective content items 406 of the content cache 604 are associated with a presentation quality constraint, such as a resolution or framerate of a video presentation. Moreover, respective devices 110 may feature a presentation capability, such as a display capability 1304 of a display 1302 of the respective client devices 110 (e.g., a maximum displayable resolution or framerate of a display 1304), or an audio capability of a speaker (e.g., stereo or mono audio presentation, and achievable volume and/or frequency spectrum). As a first such example, a first client device 110 may satisfy a request to insert a content item 406 into a hosting item 414 by choosing a selected content item 420 for which the presentation capability of the first client device satisfies the presentation quality constraint of the selected content item. As a second such example, the first client device 110 may receive a request to present a selected content item 420 within a hosting item 414, and may determine the presentation capability of the first client device 110, and compare the presentation quality constraint of the content item 406 with the presentation capabilities of other client devices 110 that are discoverable by and/or in communication with the client device 110 and/or that are accessible to the user 112. Responsive to determining that the second presentation capability of the second client device 110 presents a higher suitability for the presentation quality constraint of the selected content item 420 than the presentation capability of the first client device 110, the first client device 110 present to the user 112 a recommendation 1306 to present the selected content item 420 on the second client device 110. The first client device 110 may also provide user options in conjunction with this recommendation 1306, including a first option 1308 to view the item on the first client device 110 (resulting in the presentation of the hosting item including the selected content item 420 on the first client device 110), and a second option 1310 to view the selected content item 420 on the second client device 110. A selection of the second option 1310, indicating an acceptance by the user of the recommendation 1306, may prompt the first client device 110 to transmit to the second client device 110 a presentation request 1312 to retrieve and present the selected content item 420 to the user 110. The presentation request 1312 may include a reference to a referred content item 406 (e.g., the URL of the referred content item 406), and/or may include the actual content item 406 stored in the content cache 604 of the first client device 110. The second client device 110 may also be configured to, responsive to receiving such a presentation request 1312 from the first client device 110, retrieve the referred content item 406 (either through the content server 404 or from the first client device 110), and may present the referred content item 406 to the user 110. Many such variations in the presentation of content items 406 to the user 112 may be included in variations of the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of presenting prefetched content items to a user, the method involving a device having a processor and comprising:
executing, on the processor, instructions that cause the device to:
at a first time:
retrieve at least two content items through a content server; and
store the at least two content items in a content cache of the device;
at a second time after the first time, responsive to a request from the user to present a hosting item:
from the at least two content items in the content cache, choose a selected content item associated with a presentation quality constraint, wherein the choosing comprises:
determining a presentation capability of the device;
comparing the presentation quality constraint associated with the selected content item with the presentation capability of the device; and
choosing the selected content item based upon the presentation capability of the device satisfying the presentation quality constraint associated with the selected content item;
insert the selected content item into a content position in the hosting item; and
present the hosting item including the selected content item to the user;
at a third time after presenting the selected content item to the user within the hosting item, remove the selected content item from the content cache;
determine a second presentation capability of a second device in communication with the device;
compare the presentation capability of the device with the second presentation capability of the second device; and
responsive to determining that the second presentation capability of the second device presents a higher suitability for a second presentation quality constraint associated with a second content item than the presentation capability of the device, present to the user a recommendation to present the second content item on the second device, wherein upon selection via the device, the recommendation is configured cause the device to transmit a presentation request to the second device, wherein the presentation request is configured to cause the second device to retrieve the second content item from at least one of the content cache of the device or the content server and present the second content item.

2. The method of claim 1, wherein retrieving the at least two content items further comprises:
identifying a context indicator of a current context of the user at the first time; and
retrieving through the content server a plurality of content items that match the current context of the user at the first time.

3. The method of claim 1, wherein:
the device retrieves one or more content items over a network connection that is constrained by a variable bandwidth; and
retrieving the at least two content items through the content server further comprises:
comparing the variable bandwidth of the network connection with a bandwidth threshold; and
retrieving the at least two content items through the content server responsive to determining that the variable bandwidth of the network connection exceeds the bandwidth threshold.

4. The method of claim 1, wherein:
one or more content items provided by the content server exhibit a transfer constraint; and
retrieving the at least two content items through the content server further comprises:
for the one or more content items, comparing the transfer constraint with a variable bandwidth of a network connection of the device; and
retrieving the one or more content items through the content server responsive to determining that the variable bandwidth of the network connection satisfies the transfer constraint of the one or more content items.

5. The method of claim 1, wherein:
the content position of the hosting item exhibits a content position constraint; and
choosing the selected content item further comprises:
comparing the at least two content items stored in the content cache with the content position constraint of the hosting item; and
choosing the selected content item responsive to determining that the selected content item satisfies the content position constraint of the hosting item.

6. The method of claim 1, wherein choosing the selected content item further comprises:
identifying a context indicator of a current context of the user at the second time; and
choosing, from the content cache, the selected content item that matches the current context of the user at the second time.

7. The method of claim 1, wherein the instructions further cause the device to: before presenting the hosting item to the user, fully render the hosting item that includes the selected content item inserted into the content position of the hosting item.

8. A device that presents prefetched content items to a user, the device comprising:
a display;
a processor; and
a memory storing:
instructions that, when executed by the processor, cause the device to:
at a first time:
identify a context indicator of a current context of the user based upon at least one of one or more conversation topics of the user or a playlist of the user;
identify a plurality of content items that match the context indicator of the user;
retrieve at least two content items of the plurality of content items through a content server; and
store the at least two content items in a content cache of the device;
at a second time after the first time, responsive to a request from the user to present a hosting item:
from the at least two content items in the content cache, choose a selected content item associated with a presentation quality constraint, wherein the choosing comprises:
determining a presentation capability of the device;
comparing the presentation quality constraint associated with the selected content item with the presentation capability of the device; and
choosing the selected content item based upon the presentation capability of the device satisfying the presentation quality constraint associated with the selected content item;
insert the selected content item into a content position in the hosting item; and
present the hosting item including the selected content item to the user;
at a third time after presenting the selected content item to the user within the hosting item, remove the selected content item from the content cache; determine a second presentation capability of a second device in communication with the device;
compare the presentation capability of the device with the second presentation capability of the second device; and
responsive to determining that the second presentation capability of the second device presents a higher suitability for the presentation quality constraint associated with the selected content item than the presentation capability of the device, present to the user a recommendation to present the selected content item on the second device.

9. The device of claim 8, wherein removing the selected content item from the content cache further comprises: removing the selected content item from the content cache responsive to detecting a completion of a presentation of the selected content item to the user.

10. The device of claim 8, wherein removing the selected content item from the content cache further comprises: responsive to a cancellation request from the user to cancel a presentation of the selected content item, removing the selected content item from the content cache.

11. The device of claim 8, wherein executing the instructions by the processor further causes the device to, responsive to presenting the selected content item to the user, notify the content server that the selected content item has been presented to the user.

12. The device of claim 8, wherein executing the instructions by the processor further causes the device to:
responsive to presenting the selected content item to the user, notify the second device that the selected content item has been presented to the user.

13. The device of claim 8, wherein:
identifying the context indicator of the current context of the user is based upon the one or more conversation topics of the user.

14. The device of claim 8, wherein:
identifying the context indicator of the current context of the user is based upon the playlist of the user.

15. The device of claim 8, wherein executing the instructions by the processor further causes the device to, responsive to receiving from the user an acceptance of the recommendation to present the selected content item on the second device, transmit to the second device a presentation request to present the selected content item to the user.

16. The device of claim 8, wherein executing the instructions by the processor further causes the device to, responsive to receiving from the second device a second request to present to the user a referred content item that is accessible through the content server:
retrieve the referred content item through the content server; and
present the referred content item to the user.

17. A non-transitory machine readable medium having stored thereon processor-executable instructions that when executed cause performance of operations, the operations comprising:
at a first time:
identifying a context indicator of a current context of a user of a device based upon at least one of one or more conversation topics of the user or a playlist of the user;
identifying a plurality of content items that match the context indicator of the user;
retrieving at least two content items of the plurality of content items through a content server; and
storing the at least two content items in a content cache of the device;
at a second time after the first time, responsive to a request from the user to present a hosting item:
from the at least two content items in the content cache, choosing a selected content item associated with a presentation quality constraint, wherein the choosing comprises:
determining a presentation capability of the device;
comparing the presentation quality constraint associated with the selected content item with the presentation capability of the device; and
choosing the selected content item based upon the presentation capability of the device satisfying the presentation quality constraint associated with the selected content item;
determining a second presentation capability of a second device in communication with the device;
comparing the presentation capability of the device with the second presentation capability of the second device; and
responsive to determining that the second presentation capability of the second device presents a higher suitability for the presentation quality constraint associated with the selected content item than the presentation capability of the device, presenting to the user a recommendation to present the selected content item on the second device.

18. The non-transitory machine readable medium of claim 17, wherein:
one or more content items are retrieved over a network connection that is constrained by a variable bandwidth; and
retrieving the at least two content items through the content server further comprises:
comparing the variable bandwidth of the network connection with a bandwidth threshold; and
retrieving the at least two content items through the content server responsive to determining that the variable bandwidth of the network connection exceeds the bandwidth threshold.

19. The non-transitory machine readable medium of claim 17, wherein:
one or more content items provided by the content server exhibit a transfer constraint; and
retrieving the at least two content items through the content server further comprises:
for the one or more content items, comparing the transfer constraint with a variable bandwidth of a network connection of the device; and
retrieving the one or more content items through the content server responsive to determining that the variable bandwidth of the network connection satisfies the transfer constraint of the one or more content items.

20. The non-transitory machine readable medium of claim 17, wherein:
identifying the context indicator of the current context of the user is based upon a current location of the user.

* * * * *